United States Patent [19]

Everts

[11] Patent Number: 5,060,384
[45] Date of Patent: Oct. 29, 1991

[54] AUTOMATIC HEAD FOR A LINE TRIMMER

[75] Inventor: Robert G. Everts, Chandler, Ariz.

[73] Assignee: Inertia Dynamics Corporation, Chandler, Ariz.

[21] Appl. No.: 623,241

[22] Filed: Dec. 6, 1990

[51] Int. Cl.$^5$ ............................................. B26B 7/00
[52] U.S. Cl. ......................................... 30/276; 30/347
[58] Field of Search .................. 30/276, 347; 15/12.5, 15/12.7

[56] References Cited

U.S. PATENT DOCUMENTS

| | | | |
|---|---|---|---|
| 4,097,991 | 7/1978 | Proulx | 30/276 |
| 4,104,796 | 8/1978 | Sheldon | 30/276 |
| 4,131,997 | 1/1979 | Utter | 30/276 |
| 4,136,446 | 1/1979 | Tripp | 30/276 |
| 4,145,809 | 3/1979 | Proulx | 30/276 |
| 4,151,646 | 5/1979 | Lane | 30/276 |
| 4,161,820 | 7/1979 | Moore | 30/276 |
| 4,167,812 | 9/1979 | Moore | 30/276 |
| 4,168,572 | 9/1979 | Ewing | 30/276 |
| 4,185,381 | 1/1980 | Palmieri et al. | 30/347 |
| 4,194,287 | 3/1980 | Palmieri et al. | 30/276 |
| 4,195,408 | 4/1980 | Palmieri et al. | 30/276 |
| 4,203,212 | 5/1980 | Proulx | 30/276 |
| 4,242,797 | 1/1981 | Palmieri et al. | 30/276 |
| 4,259,782 | 4/1981 | Proulx | 30/276 |
| 4,274,201 | 6/1981 | Oberg et al. | 30/276 |
| 4,366,621 | 1/1983 | Mitchell | 30/276 |
| 4,369,577 | 1/1983 | Gise et al. | 30/276 |
| 4,419,822 | 12/1983 | Harris | 30/276 |
| 4,426,780 | 1/1984 | Foster | 30/276 |
| 4,458,419 | 7/1984 | Proulx | 30/276 |
| 4,476,632 | 10/1984 | Proulx | 30/276 |
| 4,524,515 | 6/1985 | Oberg | 30/276 |
| 4,566,189 | 1/1986 | Muto | 30/276 |
| 4,607,431 | 8/1986 | Gay | 30/276 |
| 4,633,588 | 1/1987 | Pittinger, Jr. | 30/347 |
| 4,651,421 | 3/1987 | Zerrer | 30/347 |
| 4,660,286 | 4/1987 | Engelbrecht et al. | 30/276 |
| 4,667,410 | 5/1987 | Weid et al. | 30/347 |
| 4,738,085 | 4/1988 | Nishio et al. | 56/12.7 |
| 4,790,071 | 12/1988 | Helmig et al. | 30/276 |
| 4,817,288 | 4/1989 | Hirose et al. | 30/276 |
| 4,823,465 | 4/1989 | Collins | 30/276 |
| 4,835,867 | 6/1989 | Collins et al. | 30/276 |
| 4,882,843 | 11/1989 | Baba | 30/276 |
| 4,897,923 | 2/1990 | Collins | 30/276 |
| 4,926,557 | 5/1990 | Haupt | 30/276 |
| 4,989,321 | 2/1991 | Hoffmann | 30/276 |

OTHER PUBLICATIONS

Booklet Entitled "Outdoor Power Equipment", Buyers Guide–Dated Dec. 1989–p. 29.

Primary Examiner—Douglas D. Watts
Attorney, Agent, or Firm—Brooks & Kushman

[57] ABSTRACT

An automatic line trimmer head 10 including a housing 11 containing a rotor 12 which controls rotation of a spool 16 relative to the housing in a stepwise fashion which is actuated by centrifugal force. Centrifugal force acts upon a radially expansible annular member 14 which is disposed between the housing 11 and the rotor 12. The spool 16 contains a supply of line 18 and is attached to the rotor 12 for rotation with the rotor. A shaft extends through the housing 10, rotor 12 and spool 16. The rotor 12 is biased by a helical spring 24 toward an upper plane of rotation. The radially expandable annular member 14 shifts the rotor 12 to a lower plane when centrifugal force expands the annular member 14. Teeth 54 extending radially outwardly from an outer edge 56 of a circular disk portion 50 of the rotor 12 contact an upper set of stop blocks when the circular disk portion 50 is in the upper plane. The teeth 54 contact a lower set of stop blocks 42 when the circular disk portion 50 is in the lower plane.

15 Claims, 2 Drawing Sheets

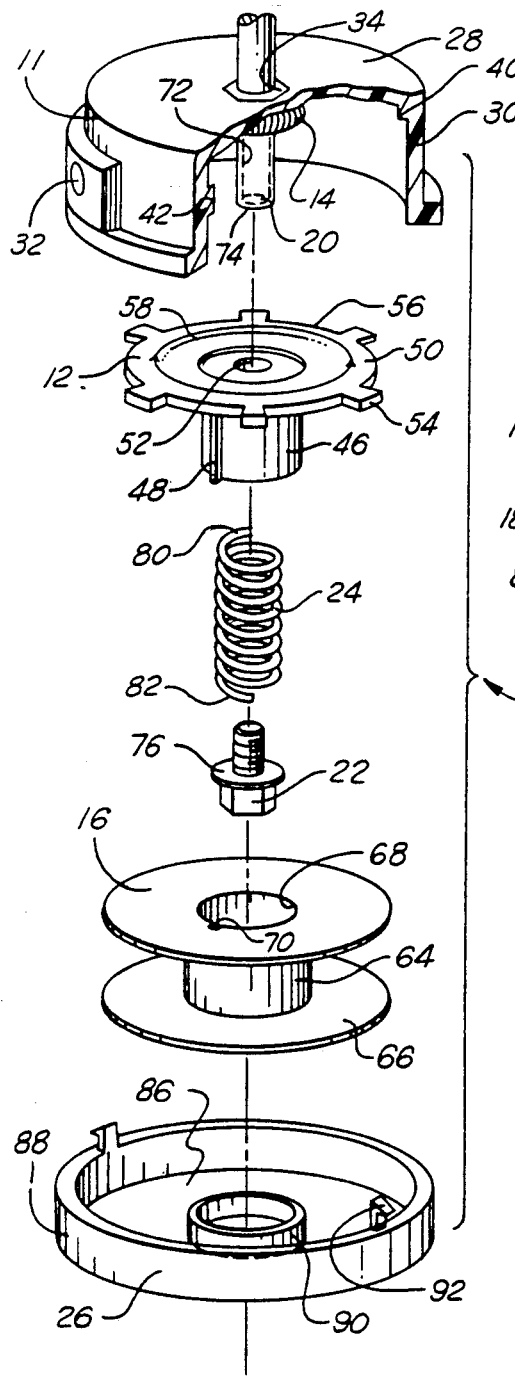
FIG.1
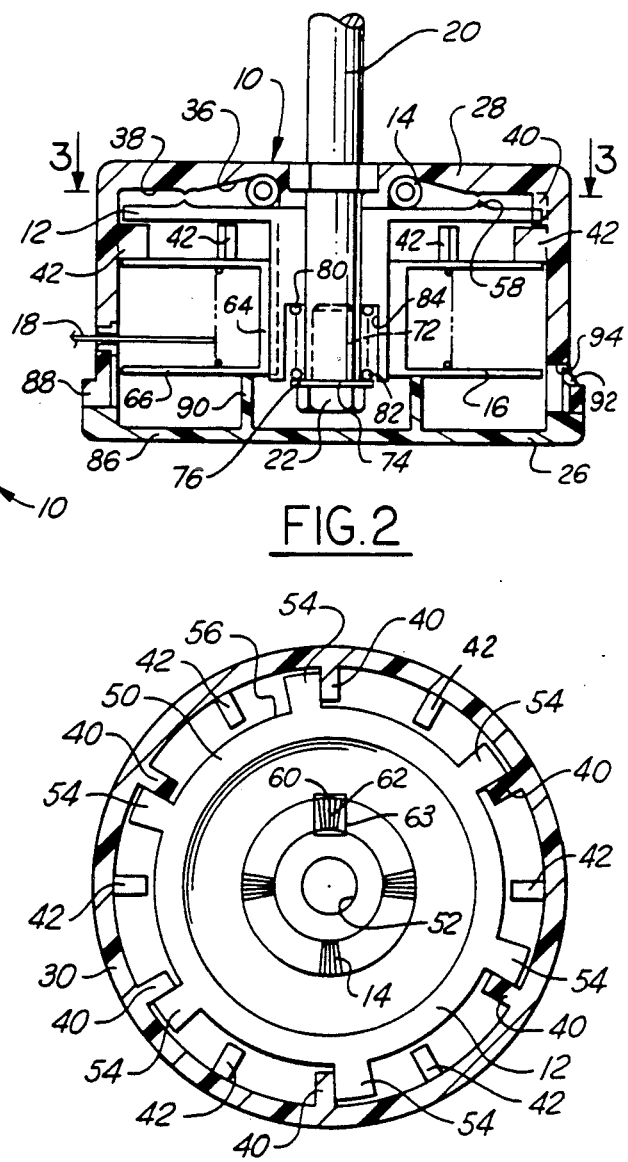
FIG.2
FIG.3

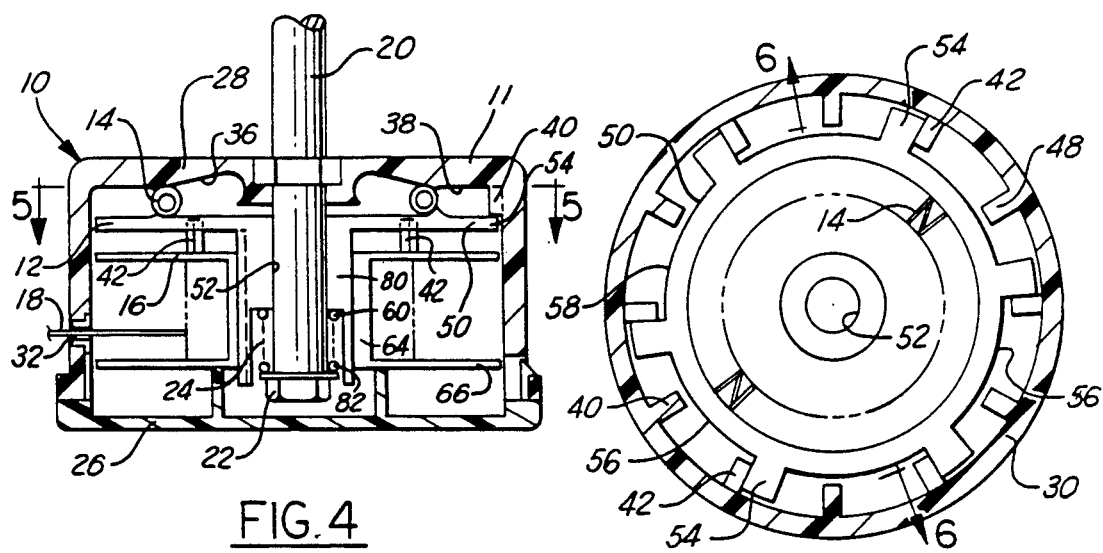
FIG. 4
FIG. 5
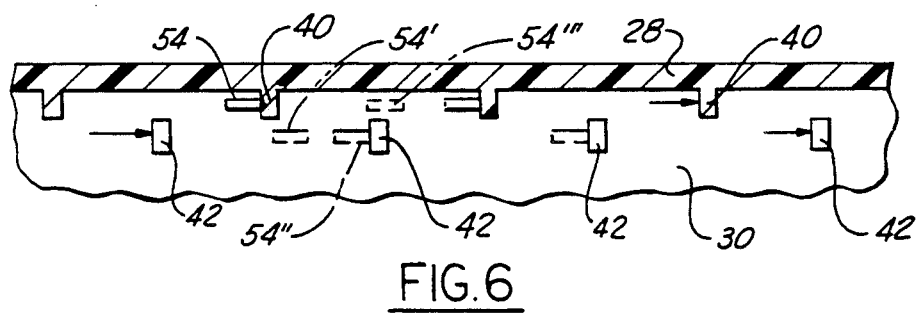
FIG. 6

AUTOMATIC HEAD FOR A LINE TRIMMER

TECHNICAL FIELD

The present invention relates to line trimmers for cutting vegetation and more particularly relates to an automatic head for a line trimmer which automatically advances controlled lengths of line.

BACKGROUND ART

Line trimmers are widely used in maintaining lawns and gardens. Line trimmers cut vegetation by rapidly rotating one or more lines about a generally vertical axis in a generally horizontal plane. The rapidly rotating line cuts vegetation upon contact. As the line trimmer is operated, occasional unavoidable contact with the ground, stones and other objects occurs which results in abrasion or even breakage of the line. Consequently, the line must be replenished periodically.

Various line trimmer heads have been developed to provide an automatic line feed feature. A common type of automatic line feed mechanism is referred to as a "bump feed" wherein the line trimmer head is bumped against the ground to feed line from the line trimmer head. When the line trimmer head is bumped against the ground, a spool is unlocked for rotation relative to the line trimmer head. The bumping action axially shifts the spool support mechanism and causes it to overcome a biasing spring which normally holds the spool in an interlocked relationship relative to the line trimmer head. The bump feed approach to feeding line presents problems in that when the trimmer is bumped against the ground, vegetation is cut too close to the ground. Further, bump feed devices must be built to withstand constant shock loads caused by the bump feeding technique which can result in wear and tear on the line trimmer device. It is also difficult to control the rate of line advance with bump feed devices.

Other approaches to automatic line feed have attempted to incorporate the use of centrifugal force to cause periodic incremental line feed. On example of such a system is disclosed in U.S. Pat. No. 4,667,410 to Weid which discloses an automatic feed line trimmer head having an axially shiftable element which is shifted by movement of a ball bearing in an inclined ramp. When the motor is turned on and off, line feeds out incrementally. A sleeve shifts in one axial direction with respect to the head when the head begins to rotate. Teeth on the sleeve engage corresponding teeth formed on the interior of the spool. The teeth of the Weid device are subjected to high shear forces that may cause the teeth to break.

Another example of a ball bearing shifting mechanism in a line trimmer head is disclosed in U.S. Pat. No. 4,566,189 to Muto. The Muto device discloses the concept of providing a hub including a plurality of balls disposed in separate tracks. As centrifugal force drives the balls radially outwardly in the tracks, the hub shifts axially against the force of a biasing spring. A line supply spool has a series of projections which engage corresponding projections on the head. One problem encountered by such ball bearing devices is that the line trimmer heads are constantly exposed to dirt and debris which may infiltrate the line trimmer head and cause problems in regard to the movement of the balls. For ball bearing devices to operate, the ball bearing tracks must be kept clean or rough operation will result. Manufacture of ball bearing shifted link trimmer heads is complicated by the need to assemble the ball bearings in tracks. Further, servicing the devices in the field can be complicated by the loss of the ball bearings.

These and other problems encountered by prior art line trimmer heads are addressed and solved by the automatic line trimmer head of the present invention.

DISCLOSURE OF INVENTION

According to the present invention, an automatic head for a line trimmer used to cut vegetation having a centrifugal force actuated line feed system is disclosed. The head includes a housing portion having a top including a central opening in coaxial alignment with an axis of rotation of the head. The housing also has a side wall depending from the top that includes a line feed opening. A rotor having a central opening and including a cylindrical portion having an integrally formed key and a circular disk portion is assembled in the housing in axial alignment with the housing. A radially expandable annular member is retained between the rotor and the housing for shifting the rotor axially depending upon the centrifugal force applied to the annular member. A spool containing a supply of line has a keyway which receives the integral key of the rotor. A shaft extends through the central openings in the housing, rotor and spool, and a retainer is provided to hold the rotor and housing on the shaft. A spring is mounted on the shaft between the retainer means and the rotor for biasing the rotor into engagement with the housing. A base cover means is secured to the housing to cover the lower end of the housing and support the spool.

The spool is alternately engaged for rotation with the housing and disengaged from the housing by step means whereby line is automatically fed from the spool through the line feed opening in the housing. The spool is engaged and disengaged by axial displacement of the rotor due to expansion and contraction of the annular member. When the rotational speed of the shaft increases, the annular member expands shifting radially outwardly along an axially inclined surface, or frustoconical groove, which contacts one side of the annular member. Conversely, reduction in the rotational speed of the shaft causes the annular member to contract radially inwardly along the inclined surface. Means are provided between the housing and the rotor for allowing stepwise rotational advancement of the rotor and spool relative to the housing as the annular member is expanded and contracted.

According to one aspect of the present invention, the radially expansible annular member is a helical spring fastened end-to-end with itself to form a toroidal annular member. The toroidal spring expands as centrifugal force is applied to it. Further, the toroidal spring slips easily along the inclined surface.

The annular member is preferably received in a frustoconical groove formed in the lower surface of the top of the housing. The frustoconical groove is concentric with regard to the central opening in the housing. When the annular member is contracted, it nests substantially within the frustoconical groove. However, when the annular member expands, it increases in diameter and shifts radially and axially outwardly in the groove. As it shifts axially, it shifts the rotor axially toward the spool.

The step means is preferably formed by a series of radially extending teeth on the disk portion of the rotor and by providing an upper and lower set of stop blocks which extend radially inwardly from an inner surface of the side wall of the housing. The upper set of stop blocks preferably adjoins the lower surface of the housing while the lower set of stop blocks is spaced from the lower surface of the housing to provide clearance for movement of the teeth of the rotor between the upper set of stop blocks and the lower surface of the housing. It is preferable to provide an equal number of teeth on the rotor and stop blocks in the upper and lower sets of stop blocks so that any forces applied to the teeth and stop blocks are spread.

The teeth of the rotor are aligned with the upper set of stop blocks when the annular member is in its contracted state. The teeth of the rotor are aligned with the lower set of stop blocks when the annular member is expanded. The rotor is rotated relative to the housing by being sequentially axially shifted away from the upper surface of the housing and below the upper set of stop blocks and then axially shifted toward the upper surface and above the upper set of stop blocks.

The spool is preferably supported on a support ring centrally disposed on the base wall of the base cover.

According to another aspect of the invention, an automatic head is provided for a line trimmer used to cut vegetation. The automatic head includes a housing having a top and cylindrical side wall depending from the top. The cylindrical side wall includes a line feed opening. The top of the housing has a lower surface which includes a frustoconical groove and a central opening in coaxial alignment relative to an axis of rotation of the head. The side wall includes an upper set of stop blocks which are spaced equidistantly about the side wall and adjoin the lower surface of the housing. The side wall also has a lower set of stop blocks which are spaced equidistantly about the circumference of the side wall and are also spaced from the lower surface of the housing. A rotor including a cylindrical portion having an integrally formed key and a cylindrical disk portion disposed at an upper end of the cylindrical portion is also provided. The rotor includes a central opening through the cylindrical and disk portions which is oriented in axial alignment with the axis of rotation of the head. The rotor has circumferentially spaced teeth which correspond in spacing and number to the upper set of stop blocks. The teeth are adapted to engage the upper set of stop blocks and then the lower set of stop blocks sequentially. A toroidal spring is retained in a toroidal configuration, that is with its ends joined together, at least partially within the frustoconical groove in the lower surface of the housing. A spool containing a supply of line has a central cylindrical portion flanked on two ends by two end walls and includes a central opening therethrough. The central opening of the spool includes a keyway which is adapted to receive the key of the cylindrical portion of the rotor. A length of line extends from the supply on the spool through the line feed opening. A shaft having a threaded opening at a lower end extends through the central openings in the housing, rotor and spool which are held on the shaft by a shouldered bolt. A helical spring is disposed on the shaft between the shouldered bolt and the base of the annular recess in the cylindrical portion of the rotor. The spring biases the rotor into engagement with the housing. The housing is enclosed by a base cover having a base wall and an annular side wall. A spool support ring is centrally disposed on the base wall to support the spool. The side walls of the base cover and housing are joined together by suitable fasteners. The automatic line feed head operates by alternatively engaging and disengaging the spool for rotation with the housing. The spool is engaged and disengaged by axial displacement of the rotor. The rotor is axially shifted relative to the upper surface of the housing by expansion and contraction of the toroidal spring. An increase in rotational speed of the shaft causes the toroidal spring to expand and shift radially outwardly in the frustoconical groove. Reduction in the rotational speed of the shaft causes the toroidal spring to contract radially inwardly in the frustoconical groove. The teeth of the rotor are aligned with the upper set of stop blocks when the toroidal spring is in its contracted state. The teeth are aligned with the lower set of stop blocks when the toroidal spring is expanded. The rotor is rotated relative to the housing by being sequentially axially shifted away from the upper surface of the housing and below the upper set of stop blocks and then axially shifted toward the upper surface and above the upper set of stop blocks.

It is an object of the invention to provide a durable and easy to assembly centrifugally actuated automatic line feed mechanism in an automatic head for a line trimmer. This purpose is in part accomplished by elimination of rolling ball elements which must be assembled to tracks or other guide devices. The device is durably constructed to spread forces to larger diameter elements, and is also resistent to problems caused by infiltration by dirt in the unit.

These and other advantages of the present invention will be better understood upon review of the attached drawings in light of the following description of the best mode for practicing the invention.

BRIEF DESCRIPTION OF THE DRAWINGS

FIG. 1 is an exploded perspective view of an automatic head for a line trimmer of the present invention.

FIG. 2 is a cross-sectional view showing the automatic head for a line trimmer while stopped or at low rotational speed.

FIG. 3 is a cross-section taken along the line 3—3 in FIG. 2.

FIG. 4 is a cross-sectional view of the automatic head for a line trimmer in a high speed rotation position.

FIG. 5 is a cross-sectional view taken along the line 5—5 in FIG. 4.

FIG. 6 is a cross-sectional view taken along the line 6—6 in FIG. 5.

BEST MODE FOR CARRYING OUT THE INVENTION

Referring now to the drawings and in particular FIG. 1, the automatic line trimmer head 10 of the present invention includes a housing 11 in which a rotor 12 is contained. A toroidal spring, or annular member 14, is disposed between the housing 11 and the rotor 12. A spool 16 contains a supply of line 18 and is attached to the rotor 12. A rotatable shaft 20 extends through the housing 10, rotor 12, toroidal spring 14 and spool 16. The housing 11 rotates with the shaft 20 while the rotor 12 and spool 16 are selectively disengageable from the shaft 20. A retainer 22 is provided to hold the above enumerated elements on the shaft 20. A helical spring 24 is disposed on the shaft 20 between the retainer 22 and the spool 16. A base cover 26 encloses the bottom of the housing 11.

The housing 11 includes a top 28 and an annular side wall 30 which depends from the top 28 to form a generally inverted cup-shaped member. The side wall 30 includes a line feed opening 32 through which the line 18 extends and is periodically fed. The top 28 of the housing 10 includes a central opening 34 through which the shaft 20 extends. The central opening 34 and shaft 20 are centered on an axis of rotation of the shaft 20. A frustoconical groove 36 is provided on the lower surface 38 of the top 28 of the housing 10. The frustoconical groove 36 is concentric relative to the central opening 34.

Step means located between the housing 11 and the rotor 12 allow stepwise rotational advancement of the rotor 12 and spool 16 relative to the housing 11. The step means includes upper stop blocks 40 disposed about the inside of the side wall 30. The upper stop blocks are preferably connected to the side wall 30 and the lower surface 38 of a top 28 of the housing 10. Lower stop blocks 42 are disposed about the inner surface of the side wall 30 and are spaced from the lower surface 38 by approximately the length of the upper stop blocks 40. Lower stop blocks 42 are spaced equidistantly about the inside surface of the side wall 30.

The rotor 12 provides the other cooperating element of the step means. The rotor includes a cylindrical portion 46 having an integrally formed key 48 extending axially along the cylindrical portion 46. The rotor 12 also includes a circular disk portion 50 at one end of the cylindrical portion 46. The rotor 12 includes a central opening 52 which extends through both the cylindrical portion 46 and the circular disk portion 50. The rotor 12 is mounted on the shaft 20 by placing the shaft 20 within the central opening 52. A plurality of teeth 54 extend radially outwardly from the outer edge 56 of the circular disk portion 50 of the rotor 12. It is preferred that the same number of teeth 54 be provided as the number of stop blocks in each of the upper set of stop blocks 40 and the lower set of stop blocks 42. As the circular disk portion 50 of the rotor 12 is rotated in an upper plane, the teeth 54 simultaneously contact the upper set of stop blocks 40. When the circular disk portion 50 rotates in a lower plane, the teeth 54 simultaneously contact the lower stop blocks 42. The circular disk portion 50 preferably includes an annular ridge 58 on the side facing the lower surface 38 of the top 28 of the housing The annular ridge 58 functions to limit radial expansion of the toroidal spring 14.

The toroidal spring 14 preferably includes a first end 60 and a second end 62 which are joined together by a coupler 63. Instead of a coupler 63, the two ends could be threaded together or welded together by known means. The toroidal spring 14 is assembled to the unit 10 by placing it into the frustoconical groove 36 of the top 28. When the toroidal spring 14 is unexpanded, such as when the shaft is not rotated and no centrifugal force is applied to the spring, the toroidal spring 14 is substantially nested within the frustoconical groove 36. As centrifugal force increases upon rotation of the shaft 20, the toroidal spring 14 expands causing it to move outwardly in the frustoconical groove 36 in both a radial direction and axially toward the rotor 12. The expansion axially causes the rotor 12 to shift axially along the shaft 20 countering the biasing force of the helical spring 24. Expansion of the toroidal spring 14 is permitted to continue until the toroidal spring contacts the annular ridge 58 formed on the circular disk portion 50 of the rotor 12.

The spool 16 includes a cylindrical portion 64 which is flanked by two parallel end walls 66. The spool also includes a central opening 68 through which the shaft 20 extends. A keyway 70 is preferably formed in the central opening 68. The keyway 70 is adapted to receive the integrally formed key 48 of the rotor 12 to key the spool 16 and rotor 12 together for rotational movement. The key 48 and keyway 70 allow limited axial displacement of the rotor 12 relative to the spool 16.

The shaft 20 includes a threaded hole 72 at its lower end 74. The threaded hole 72 is provided to receive the retainer 22. The retainer 22 preferably includes a shoulder 76. In the illustrated embodiment, the retainer 22 is a shouldered bolt.

Spring 24 includes a top end 80 and a bottom end 82 at opposite axial ends thereof. The top end 80 is received in an annular recess 84 formed in the rotor 12. The annular recess extends upwardly from the lower end of the cylindrical portion 46 of the rotor 12. The bottom end 82 of the spring 24 engages the shoulder 76 of the retainer 22.

The base cover 26 includes a base wall 86 which is connected to an annular side wall 88 that extends about the periphery of the base wall 86. A spool support ring 90 is formed about the center of the base wall 86. The spool support ring 90 supports the spool 16 for relative rotational movement to the housing and base cover 26. Locking tabs 92 are provided on the annular side wall 88. The locking tabs 92 are received in tab receptacles 94 formed in the lower portion of the side wall 30 of the housing 10.

Operation of the automatic line trimmer head will be described with reference to FIGS. 2 through 6. In FIGS. 2 and 3, the head 10 is shown in its at rest position with the toroidal spring 14 contracted and seated to its maximum extent in the frustoconical groove 36 in the lower surface 38 of the housing 10. The helical spring 24 is in its extended position, and the rotor 12 is in its upper position with the teeth 54 on the outer edge 56 of the circular disk portion 50 in contact with the upper stop blocks 40.

Referring now to FIGS. 4 and 5, the shifted position is shown wherein the toroidal spring 14 is shifted by centrifugal force radially outwardly and axially toward the rotor 12 causing the rotor 12 to be shifted to its lower position wherein the circular disk portion 50 and teeth 54 are aligned with the lower stop blocks 42. Centrifugal force applied to the toroidal spring 14 causes the toroidal spring to expand. As the toroidal spring expands, it moves outwardly in the frustoconical groove 36 and at the same time shifts axially toward the rotor 12. Expansion of the toroidal spring 14 is stopped when it contacts the annular ridge 58 on the circular disk portion 50 of the rotor 12. The rotor 12 is thereby shifted against the biasing force of the helical spring 24 on the shaft 20. When the teeth 54 disengage the upper stop blocks 40, the teeth slip under the upper stop blocks 40 and the rotor 12 and spool are permitted to rotate in a stepwise fashion until the teeth 54 contact the lower stop blocks 42.

Referring now to FIG. 6, the stepwise rotation is illustrated. Movement of a single tooth 54 is described in a cycle starting with the tooth 54 in engagement with the upper stop block 40. As the rotational speed of the head increases, the tooth 54 is shifted axially by the toroidal spring 14 until it clears stop block 40 at 54'. The rotor then rotates relative to the housing until the tooth 54 reaches the position shown at 54" where it engages lower stop block 42. The rotor remains in this position until the rotational speed of the unit is reduced and the toroidal spring 14 is allowed to contract at which time the helical spring 24 biases the rotor 12 upwardly until it clears the lower stop block 42 as shown at 54'''.

The preceding description of the illustrated embodiment of the invention is intended to describe the best mode of practicing the invention. It will be readily appreciated by one of ordinary skill in the art that certain modifications and improvements may be made to the disclosed embodiment without departing from the spirit and scope of the present invention. The present invention should be measured by the following claims.

I claim:

1. An automatic head for a line trimmer used to cut vegetation comprising:

a housing having a top including a central opening in coaxial alignment relative to an axis of rotation of the head and a side wall depending from said top and having a line feed opening formed in said side wall;

a rotor having a central opening and including a cylindrical portion having a key and including a circular disk portion disposed at an upper end of said cylindrical portion, said cylindrical portion and disk portion being oriented in axial alignment with said axis of rotation;

a radially expansible annular member retained between said rotor and said housing;

a spool having a central opening therethrough, said central opening of said spool being adapted to receive said cylindrical portion of said rotor and having a keyway formed therein for receiving said key of said cylindrical portion of said rotor;

a supply of line wound around said spool with a length of said line extending through said line feed opening;

a shaft having a lower end and extending along the axis of rotation and through said central openings in said housing, said rotor and said spool;

retainer means secured to said lower end of said shaft for holding said rotor and said housing on said shaft;

spring means disposed on said shaft between said retainer means and said rotor for biasing said rotor into engagement with said housing;

base cover means secured to said housing for covering the lower end of said housing and for supporting said spool;

said spool being alternately engaged and disengaged for rotation with said housing to automatically feed line from said spool through said housing, said spool being engaged and disengaged by axial displacement of said rotor, said rotor being axially displaced relative to the top of said housing by the expansion and contraction of said annular member wherein an increase in the rotational speed of said shaft causes said annular member to expand shifting radially outwardly across an inclined surface contacted by said annular member on one side and wherein reduction in the rotational speed of said shaft causes said annular member to contract radially inwardly across said inclined surface; and step means disposed between said housing and said rotor for allowing stepwise rotational advancement of the rotor and spool relative to the housing as the annular member is expanded and contracted.

2. The automatic head for a line trimmer of claim 1 wherein said inclined surface is a frustoconical groove in a lower surface of said top of said housing, said conical groove being concentrically located relative to the central opening in said top of said housing.

3. The automatic head for a line trimmer of claim 1 wherein said step means includes an upper set of stop blocks spaced about said side wall and adjoining said lower surface of said housing, said side wall having a lower set of stop blocks spaced about the circumference of said side wall and being spaced from said lower surface.

4. The automatic head for a line trimmer of claim 3 wherein said rotor has circumferentially spaced teeth corresponding in spacing and in number to said upper set of stop blocks and said lower set of stop blocks, said teeth being adapted to engage said upper set of stop blocks and then said lower set of stop blocks sequentially.

5. The automatic head for a line trimmer of claim 4 wherein said teeth of said rotor are aligned with said upper set of stop blocks when said annular member is in its contracted state and wherein said teeth are aligned with said lower set of stop blocks when said annular member is expanded, said rotor being rotated relative to said housing by being sequentially axially shifted away from said upper surface of said housing and below said upper set of stop blocks and then axially shifted toward said upper surface and above said upper set of stop blocks.

6. The automatic head for a line trimmer of claim 1 wherein said radially expansible annular member is a helical spring having opposite ends joined together to form a toroidal configuration.

7. The automatic head for a line trimmer of claim 1 wherein said spool includes a central cylindrical portion flanked on two ends by two end walls.

8. The automatic head for a line trimmer of claim 1 wherein said shaft has a threaded opening at said lower end thereof for receiving said retainer means.

9. The automatic head for a line trimmer of claim 8 wherein said retainer means is a shouldered bolt secured to the threaded opening at the lower end of said shaft.

10. The automatic head for a line trimmer of claim 1 wherein said base cover means comprises a base wall and an annular side wall.

11. The automatic head for a line trimmer of claim 10 wherein said base wall includes a spool support ring centrally disposed on said base wall, said spool being supported on said spool support ring.

12. The automatic head for a line trimmer of claim 2 wherein locking tab means are provided for interconnecting said cylindrical side wall of said housing and said annular side wall of said base cover.

13. The automatic head for a line trimmer of claim 1 wherein said circular disk portion has an upper surface having an annular ridge facing said top of said housing.

14. The automatic head for a line trimmer of claim 13 wherein said annular ridge on said upper surface of said rotor is contacted upon full expansion of said annular member.

15. An automatic head for a line trimmer used to cut vegetation comprising:

a housing having a top and a substantially cylindrical side wall depending from the top and having a line feed opening formed in said side wall, said top of said housing having a lower surface including a conical groove and a central opening in coaxial alignment relative to an axis of rotation, said side wall having an upper set of stop blocks spaced equidistantly about said side wall and adjoining said lower surface, said side wall having a lower set of stop blocks spaced about the circumference of said side wall and being spaced from said lower surface;

a rotor including a cylindrical portion having an integrally formed key and including a circular disk portion disposed at an upper end of said cylindrical portion, said rotor having a central opening through the cylindrical and disk portions, said rotor having circumferentially spaced teeth corresponding in spacing to said upper and lower sets of stop blocks, said teeth being adapted to engage said upper set of stop blocks and said lower set of stop blocks sequentially;

a toroidal spring retained in a toroidal configuration and being partially disposed in said conical groove of said lower surface of said housing;

a spool having a central cylindrical portion flanked on two ends by two end walls and having a central opening therethrough, said central opening of said spool being adapted to receive said cylindrical portion of said rotor and having a keyway formed therein for receiving said key of said cylindrical portion of said rotor;

a supply of line wound about said spool with a length of said line extending through said line feed opening;

a shaft having a threaded opening at a lower end, said shaft extending through said central openings in said housing, said rotor and said spool;

a shouldered bolt being secured to said shaft to hold said rotor and said housing on said shaft;

a helical spring disposed on said shaft between said shouldered bolt and said base of said annular recess in said cylindrical portion of said rotor, said spring biasing said rotor into engagement with said housing;

a base cover having a base wall and an annular side wall, a spool support ring centrally disposed on said base wall, said spool being supported on said ring;

fastener means interconnecting said cylindrical side wall of said housing and said annular side wall of said base cover; and said spool being alternatively engaged and disengaged for rotation with said housing to automatically feed line from said spool through said housing, said spool being engaged and disengaged by axial shifting of said rotor, said rotor being axially shifted relative to the upper surface of said housing by the expansion and contraction of said toroidal spring wherein an increase in the rotational speed of said shaft causes said toroidal spring to expand shifting radially outwardly in said conical groove and reduction in the rotational speed of said shaft causes said toroidal spring to contract radially inwardly in said conical groove, said teeth of said rotor being aligned with said upper set of stop blocks when said toroidal spring is in its contracted state and wherein said teeth are aligned with said lower set of stop blocks when said toroidal spring is expanded, said rotor being rotated relative to said housing by being sequentially axially shifted away from said upper surface of said housing and below said upper set of stop blocks and then axially shifted toward said upper surface and above said upper set of stop blocks.

* * * * *